United States Patent [19]

Stober

[11] Patent Number: 5,683,493
[45] Date of Patent: Nov. 4, 1997

[54] PACKING FOR SEPARATION COLUMNS AND PROCESS OF USE

[76] Inventor: Berne K. Stober, 53 Manners Rd., Ringoes, N.J. 08551

[21] Appl. No.: 684,106

[22] Filed: Jul. 19, 1996

[51] Int. Cl.$^6$ ............................................. B01F 3/04
[52] U.S. Cl. .................. 95/219; 261/DIG. 72; 261/79.2; 261/114.3
[58] Field of Search ............. 261/DIG. 72, 79.2, 261/114.3; 95/199, 211, 219, 221, 223

[56] References Cited

U.S. PATENT DOCUMENTS

| | | | |
|---|---|---|---|
| 3,045,989 | 7/1962 | Kittel | 261/114.3 |
| 3,233,389 | 2/1966 | Dahlen | 95/219 |
| 3,233,879 | 2/1966 | Mitchell | 261/114.3 |
| 4,113,810 | 9/1978 | Ikawa | 261/98 |
| 4,159,817 | 7/1979 | Ikawa | 249/98 |
| 4,349,360 | 9/1982 | Schuurmans et al. | 261/79.2 |
| 4,361,469 | 11/1982 | Trutna | 203/99 |
| 4,376,081 | 3/1983 | Leva | 261/94 |
| 4,490,310 | 12/1984 | Plaskura et al. | 261/DIG. 72 |
| 4,499,035 | 2/1985 | Kirkpatrick et al. | 261/114 |
| 4,752,307 | 6/1988 | Asmus et al. | 261/79.2 |
| 4,814,117 | 3/1989 | Leva | 261/94 |
| 5,073,236 | 12/1991 | Gelbein et al. | 203/29 |
| 5,132,056 | 7/1992 | Lockett et al. | 261/112.2 |
| 5,234,741 | 8/1993 | Kaffrell | 428/184 |
| 5,244,604 | 9/1993 | Miller et al. | 261/97 |
| 5,413,741 | 5/1995 | Buchholz et al. | 261/112.2 |
| 5,464,573 | 11/1995 | Tokerud et al. | 261/97 |

FOREIGN PATENT DOCUMENTS

| | | |
|---|---|---|
| 0232925 | 8/1987 | European Pat. Off. . |
| WO 95/25571 | 9/1995 | WIPO . |

OTHER PUBLICATIONS

Peerless Manufacturing Company, Swirl Tube Separation System.

*Primary Examiner*—Tim R. Miles
*Attorney, Agent, or Firm*—Gerald L. Harris; Malcolm D. Keen

[57] ABSTRACT

A fluid separation packing that is useful as a packing material for distillation and fractionation columns or towers which provides for co-current liquid and vapor contact during the countercurrent separation process. The packing comprises a number of connected packing elements, suitably in the form of connected octagons, which have continuous side walls with an upper end and a lower end which terminates in a base with a vapor opening and a vapor tab above the opening. The side walls which define openings between adjacent packing elements are connected to one another to define a contacting volume above the base and there is a liquid slit on the side wall. The packing is also provided with liquid downcomers which have side walls with their upper portions within the openings between adjacent packing elements, and their lower portions extending below the packing element base. Downcomer ports through which liquid can flow are located proximate to the lower ends of the downcomers.

20 Claims, 4 Drawing Sheets

PACKING FOR SEPARATION COLUMNS AND PROCESS OF USE

FIELD OF THE INVENTION

The present invention relates to fluid separation packing that is useful as a packing material for distillation and fractionation columns or towers. More specifically, the present invention relates to fluid separation packing that provides for co-current liquid and vapor content within the overall context of the current separation process.

BACKGROUND OF THE INVENTION

Various research has been conducted with respect to the optimization of designs for distillation and fractionation columns or zones, i.e., a contacting column or zone wherein liquid and vapor phases are counter currently contacted to effect separation of a fluid mixture, as for example, by contacting of the vapor and liquid phases on a series of vertically spaced horizontal trays or plates mounted within the column. The design research has primarily focused on the design of different tray structures to improve the efficiency of the overall separation process. Attempts have also been made to design superior packing materials to be placed within the column to enhance the separation process.

The distillation process as traditionally known in the art is a method for separating the individual components of a mixture by utilizing the differences in their vapor pressure. In particular, in the chemical industry, a variety of tray designs have been developed to increase the efficiency of the mass transfer. Improvements in the design of distillation columns led to the use of different types of packing for filling the insides of such distillation columns. For instance, the packing now in use includes wire mesh packing, sheet metal packing, ceramic packing, glass packing, and synthetic resin packing.

Many types of packing have been developed for use in distillation and fractionation columns. In general, these packing materials facilitate contact between the liquid and vapor streams by causing more uniform distribution of liquid and vapor over the surface of the packing. Early forms of structured packing include Stedmen packing, described in U.S. Pat. No. 2,047,444. In general, structured packing refers to packing where individual members have a specific orientation relative to each other and to the axis of the column or tower. Random packing, such as the use of Raschig saddles, is also used in the industry.

One type of packing that is widely used consists of a plurality of corrugated plates that contact each other and are disposed in parallel relationship to the column axis. Corrugated plates of this type can be constructed of different types of material such as sheet metal and woven wire fabric. When the corrugated plates are made of sheet metal, uniform distribution of the liquid over the plates is impeded because the liquid tends to channel along the fold troughs. To improve liquid distribution over the corrugated plates, it is known to use apertures in the plates so that a portion of the liquid flowing along one side of the plate is deflected to the opposite side of the plate as it encounters an aperture. An example of such a plate is described in U.S. Pat. No. 4,296,050 to Meier. A column packing made with corrugations and textured surfaces for improved performance especially under turn down conditions is disclosed in U.S. Pat. No. 5,132,056 to Lockett et al. An improved corrugated plate design to achieve a higher density of plates within a given cross-sectional area of the column to achieve enhanced mass and/or heat transfer between the liquid and vapor streams flowing within the column is set forth in U.S. Pat. No. 5,413,741.

Other types of packing besides the corrugated and textured surface trays include packing that consists of individual packing elements. The efficiency in using such packing elements is generally considered to be increased by providing the elements in a random order such as taught in U.S. Pat. No. 4,376,081 to Leva which discloses an element that has a base that has a surface contour which is generated by the rotation of a two-dimensional curve having reverse curvature through an approximate angle range of from 10° to 180° around a straight line that lies within the plane of the curve. The base of the packing element is further provided with slots and depending tongues. A distillation column packing in the form of a spherical body constructed by assembling a pair of hemispherical members of the same shape and structure wherein each of the hemispherical members includes a suitable member of cutout openings formed on the surface portion thereof are shown in U.S. Pat. No. 4,159,817 to Ikawa.

Improvements in distillation and fractionation column design are needed to increase the efficiency or capacity of the overall separation process and thereby reduce operating and/or fixed costs. Improved designs, preferably would take advantage of the entire volume within the column for use in the separation process and utilize the advantages of both the trays and packing elements in combination.

SUMMARY OF THE INVENTION

A fluid separation packing that is useful as a packing material for distillation columns, fractionation columns, and the like, is provided by the present invention. The fluid separation packing provides for increased separation efficiency and/or increased separation capacity by more effectively utilizing the available space within the column. Further, under proper vapor flowrates, the packing of the present invention provides for co-current contact between the vapor and liquid fluids within the context of the overall countercurrent process.

The fluid separation packing, in one embodiment, comprises a plurality of connected packing elements that have a base and a continuous side wall having an upper end and a lower end. The lower end of the side wall terminates into the base and the upper end defines an upper packing element plane region. The side walls thus define a contacting volume that is above the base and below the upper packing element plane region. There is at least one, and preferably several, vapor openings in the base through which vapors can flow into the contacting volume. There is also at least one, and preferably several, liquid slits located on the side walls, the liquid slits defining an opening in the side wall through which liquid can flow. The packing elements are connected in such a way that the sidewalls of adjacent packing elements contact each other to an extent, but not totally, and thus the sidewalls also define an opening between adjacent packing elements.

The packing elements are connected to form a row or plane of packing elements within the column. Various other such rows are nested on top of one another to fill a section of the column with the packing elements.

There are a plurality of downcomers in flow communication with the packing elements to provide a means for liquid transport between the various rows of packing elements. The downcomers have sidewalls that have an upper portion and a lower portion. The upper portion is located within the opening between the adjacent packing elements, and in preferred embodiments the upper portion is formed directly from the sidewalls of the packing elements. The lower portion extends below the packing element base and has a lower portion end. There is at least one port located proximate to the lower portion end that defines an opening in the downcomer side walls through which liquid can flow. Upon nesting of the various rows of packing elements, the downcomers are aligned such that they are situated within the contacting volume, and preferably centered in or near the middle of the contacting volume, of a packing element on the next vertically lower row.

In preferred embodiments, the vapor openings are located proximate to the side walls of the packing element, and between the downcomer lower portion and the side walls of the packing element. It is also preferred to locate the liquid slits at points proximate to the upper end of the side walls.

The geometry of the packing elements and of the downcomers can be varied for different uses. However, it is preferred that the side walls of the packing elements be of an octagon shape. In such an octagon arrangement, the side walls define square openings between adjacent packing elements and those square openings can be used as the upper portion of the downcomers.

In operation, the vapor within the column flows upward through the inner-connected and nested packing elements. The vapor flows from one row of packing elements to the next by means of the vapor openings in the base of the packing elements. The liquid flows from one row of packing elements to the next by means of the downcomers, which deposit the liquid onto the base of the packing element. The liquid thus contacts the vapor within the contacting volume within the packing element. Under proper vapor flowrates, the vapor entrains the liquid and carries it upward through the contacting volume. In the preferred embodiments, the vapor tabs are positioned such that they direct the vapor and entrained liquid flow in a rotational fashion upward through the contacting volume. Near the top of the packing element, the vapor and liquid are separated with the liquid flowing out of the packing element by means of the liquid slit and the vapor flowing upward through a vapor opening in the next row of packing elements.

The present invention thereby also provides an improved process for fractionating, distilling, and the like, the improvement comprising providing a vertical column having surrounding sidewalls and feeding a first and a second fluid into the column, wherein the first fluid is in its vapor state and the second fluid is in its liquid state within the column. The first and second fluids are then directed to flow through various stacked layers of connected packing elements as described above. The fluids are also directed to flow through a plurality of liquid downcomers as described above. In the process the vapors present within the column flow upward from one layer of packing elements to the next through the vapor openings and the liquid present within the column flows downward from one layer of packing elements to the next by passing through the liquid slit and through the downcomers, and whereby the liquid and vapor contact each other in a co-current fashion within the contacting volume of the packing elements.

DETAILED DESCRIPTION OF THE INVENTION

The present invention is directed to improved fluid separation packing, useful as a packing material for distillation and fractionation columns or towers. Such columns separate a feed material into at least two components due to their distinct vapor pressures. These columns operate generally by the counter-current contact of an upcoming vapor stream with a downcoming liquid stream. The mass separation can be enhanced by providing co-current contact between the vapor and liquid phases within discrete sections of the column. The fluid separation packing of the present invention is uniquely designed to accomplish such co-current contact under appropriate conditions.

The fluid separation packing is comprised of stacked layers of orderly arrays of packing elements that contact and nest upon one another. It is within the packing element that the liquid from the layer above and the vapor from the layer below come into contact, mix, and undergo mass transfer. The packing elements have a base, or floor, and side walls that rise up from the base and thus define a contacting volume within the packing element. The base of the packing element is closed, except that openings are provided in the base for allowing the vapor to flow through and enter the contacting volume within the packing element. Vapor tabs are positioned above the openings and the vapor tabs are oriented in such a way as to direct the flow of the vapor in a rotational manner through the contacting volume. The packing elements are designed and arranged such that a significant number of the side walls that are not in contact with the side wall of another packing element form the upper portion of the downcomers for the liquid to flow into the contacting volume of a packing element in the next vertically lower level of packing elements. At sufficiently high vapor flow rates, the liquid is entrained by the vapor and thrust upwards towards the side wall of the packing element by the vapor tabs. As the liquid rotates up the side walls it is directed to the downcomers by flowing through a slit in the side wall. From these slits the liquid descends through the downcomer to the next lower packing layer. In such a way, there is established co-current contact of the liquid and vapor within the contacting volume of the packing element and within the overall counter-current mode of separation.

Figure 1:
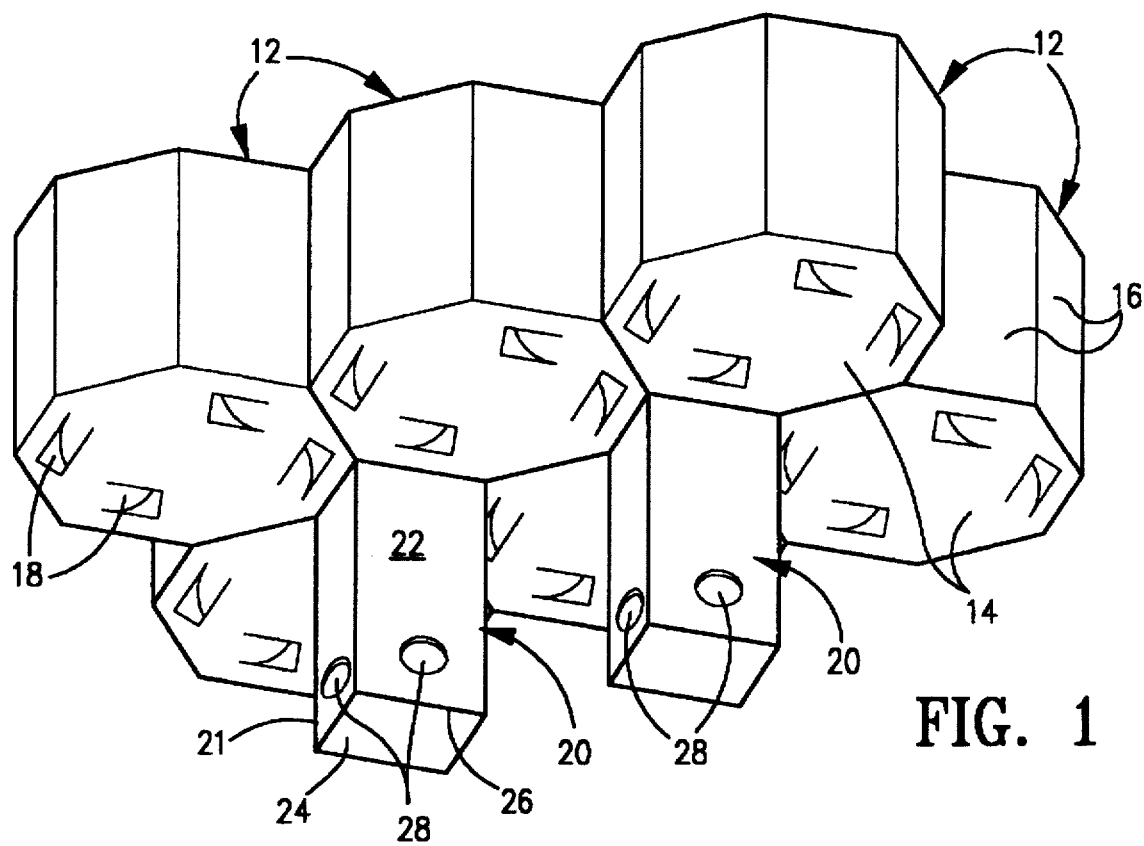
FIG. 1 is a view of a plurality of packing elements and downcomers of the present invention.

The description of the fluid separation packing can be more readily understood by reference to the Figures. FIG. 1 shows one embodiment of the fluid separation packing of the present invention employing an octagonal geometry for the design of the packing element. This view shows the arrangement of six packing elements 12. The packing elements 12 are constituted by a base 14 and side walls 16. The base 14 contains a plurality of tabs 18 that preferably extend upwardly into the packing element 12. The tabs 18 direct the vapor that centers through the base 14 via opening 15 (see FIG. 3) towards the side walls 16. At the intersection between the packing elements 12 there is shown two downcorners 20, which extend upward between the side walls 16 of the packing elements 12 (not shown). The downcomers 20 have side walls 21 that extend below the packing elements 12, and thus define a lower portion 22 of the downcomer 20, and these side walls 21 terminate at the bottom 26 of the downcomer 20 in a closed section 24. The downcomers 20 preferably have a plurality of liquid ports 28 proximate to their bottom 26 to efficiently distribute the liquid onto the base 14 of the next vertically lower level of packing elements 12.

Figure 2:
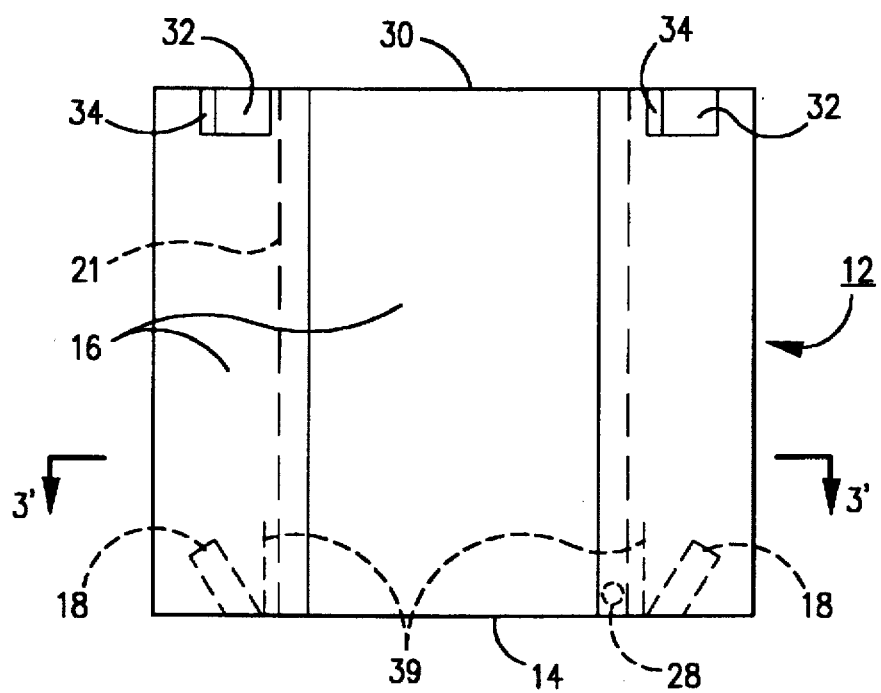
FIG. 2 is a front view of a packing element of the present invention.

A single packing element 12 is shown in FIG. 2. Again, and for consistency herein and throughout the basic description of the invention, the octahedral geometry for the design of the packing element 12 will be used for its description. The interconnection between various layers of the packing elements will be more readily understood by using the same geometry for the description of the fluid separation packing. Again, the base 14 and side walls 16 are shown as defining the packing element 12. The side walls 16 terminate at their upper ends 30. The upper ends 30 of the side walls 16 define an upper region plane of the packing element. The area within the packing element 12 defined by the space between the base 14 and the upper region plane formed by the upper ends 30 of the sidewalls 16, is the contacting volume (not labeled).

The vapor enters the packing element 12 through an opening 15 (shown in FIG. 3), which is preferably made from the cut-out section of the base 14 forming the vapor tabs 18 as shown in the embodiment depicted in FIG. 2. The tabs 18 in FIG. 2 are shown as projecting from the base 14 up into the contacting volume. The tabs 18 are used to direct the flow of the upcoming vapor towards the sidewalls 16 in a rotating fashion. The angle between the tabs 18 and the base 14, the length of the tabs 18, and the shape of the tabs 18 can all be varied to alter the flow direction of the vapor. The tabs 18 do not need to be physically joined with the base 14, although it is preferred for ease of manufacturing.

The liquid enters the contacting volume within a packing element by means of a downcomer 20 that is connected to the next vertically higher layer of packing elements. The lower portion of the downcomer, defined by downcomer side walls 21, is shown in the simplified FIG. 2. The liquid enters the packing element 12 at a point proximate to, and preferably directly onto, the base 14 through port 28. A liquid seal weir 39 can optionally be used to seal the ports 28 and to prevent vapor from flowing up the downcomer; the weir 39 being shown here as a low wall surrounding the downcomer sidewalls 21 and thus creating a cavity in which a liquid head is created with the liquid spilling over the top of the weir 39 during operation. The liquid is thus entrained by the upcoming vapor, entering the packing element 12 through opening 15 and directed by tab 18, and the liquid rises up through the packing element 12 along the sidewalls 16. The packing element 12 has slits 32, shown here as cut-outs in the side walls 16 and projecting inward into the contacting volume, that define an opening 34 in the side walls 16 for removing the uprising liquid from the packing element 12 and allowing the liquid to flow by means of gravity to the next lower level of packing elements by means of the downcomer 20 (not shown).

Figure 3:
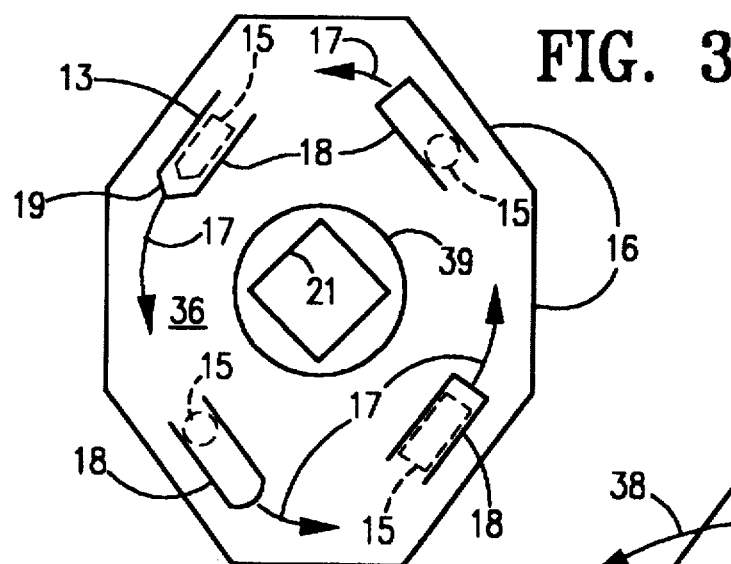
FIG. 3 is a cross-sectional view taken along line 3—3 from FIG. 2 of the base of a packing element of the present invention.

The flow of the vapor through the packing element 12 is illustrated in FIG. 3, which is a cross-sectional view taken along line 3'—3' in FIG. 2. As can be seen from FIG. 2, the vapor rises to the upper ends 30 of the side walls 16 and is separated there from the liquid, which travels through opening 34 into a downcomer. The vapor flows against the outside bottom face of base 14 of a packing element that is part of the next vertically higher layer of packing elements. The vapor enters into this upper level of packing elements through the openings 15 (FIG. 3), which are preferably located beneath the tabs 18. It is further desirable to locate the openings 15 and tabs 18 proximate to the side walls 16 to ensure that the liquid/vapor mixture contacts the side walls for improved mass transfer and in view of the fact that the downcomer 20 (not shown) is preferably positioned near the center of the packing element 12.

The tabs 18, as discussed above, can be of various shapes, and in FIG. 3 the leading edge 19 of the tabs 18 are shown as having various geometries, and the sides 13 of the tabs 18 can also be of different geometries. Also, the openings 15, through which the vapor flows into the packing element 12, can be of any geometry as shown in FIG. 3. The vapor flow is represented by lines 17. The contacting volume 36 is also shown in FIG. 3.

Figure 4:
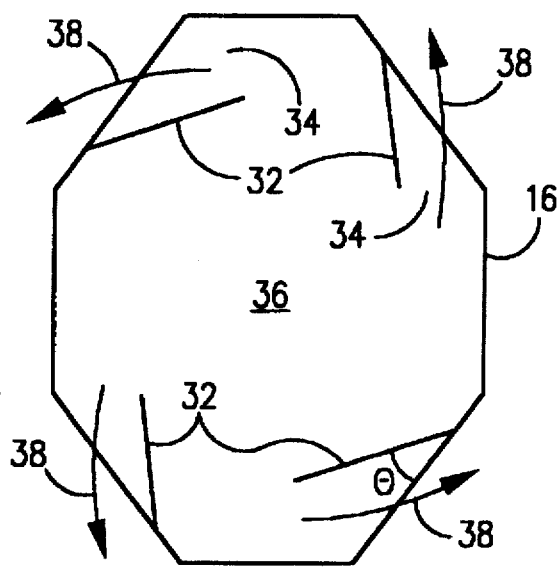
FIG. 4 is a top view of a packing element of the present invention.

The liquid flow from the packing element 12 into a downcomer is highlighted in FIG. 4, which is a top view of the packing element 12. The slits 32 are shown as projecting into the contacting volume 36, but could also project outward into the downcomer. Slits 32, such as those shown in FIG. 4, can be made at any angle, θ, from the side wall 16. The slits 32 could also be designed as louvers or any other type of opening in the side wall 16 to enhance the flow of the liquid into the downcomer. The slits 32 define the openings 34 through which the liquid flows as represented by lines 38.

Figure 5:
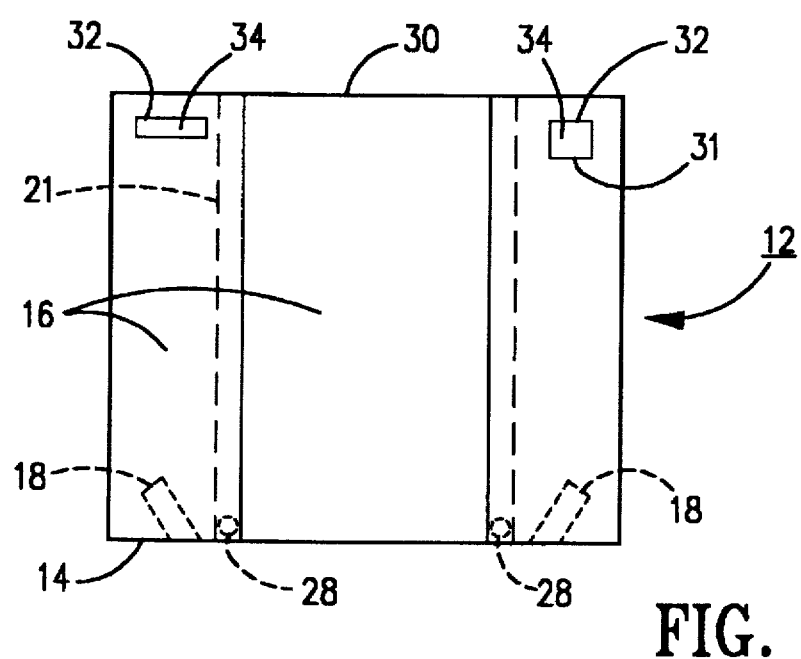
FIG. 5 is a front view of a packing element of the present invention.

The slits 32 shown in FIG. 4 are functionally present to provide the openings 34 in the side walls 16 for the removal of the liquid from the packing element 12. The removed liquid then flows into a downcomer 20 (not shown). In that regard, the slits 32 can be cut-outs made into the side walls 16. Such a slit 32 design is shown in FIG. 5, where the slits 32 are cut-out sections of the side walls 16, thus defining the opening 34 for the liquid to exit. The slits 32 can take any type of geometric shape such as squares, rectangles, circles, louvers, etc. as illustrated in FIG. 5. It is preferred to locate the slits 32 at a point proximate to the top of the packing element 12 for increased contact between the liquid and the vapor. Indeed, in FIG. 2, the slit 32 is shown as being cut from part of the upper ends 30 of the side walls 16. However, they can be located at a point below the upper ends 30 of the side walls as shown in FIG. 5. Preferably, the lower edge 31 of the slit 32 will be located at a point at least halfway vertically up the side wall 16, more preferably at a point at least 75% vertically up the side wall 16.

Figure 6:
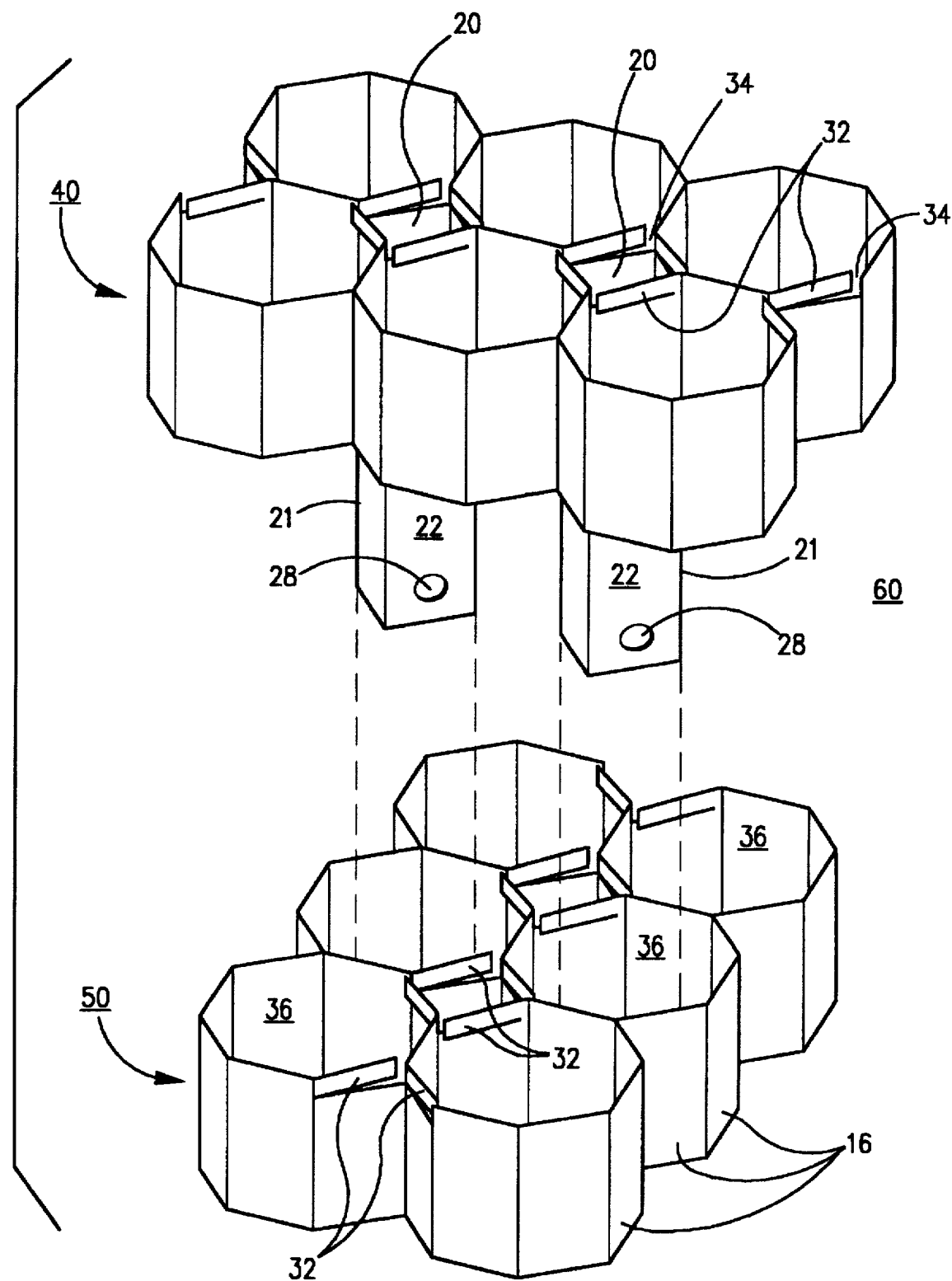
FIG. 6 is a view of a nesting and stacking of two rows of packing elements and associated downcomers of the fluid separation packing of the present invention.

The packing elements 12 are combined in a nested fashion to assemble the fluid separation packing 60 of the present invention. The nesting of the packing elements is represented in FIG. 6. In this case, the joining of two levels of packing elements is shown. The upper level of packing elements 40 is to be inserted into the lower level of packing elements 50 prior to use within the separation column. The downcomers 20 from upper level 40 are formed, at their upper section, by the side walls 16 of the packing elements 12. The downcomers 20 extend beyond the upper level 40 as shown by downcomer side walls 21 that form the lower portion 22 of the downcomer 20. This lower portion 22 of the downcomer 20 is inserted into the contacting volume 36 of a packing element 12 located in the lower level 50.

Figure 7:
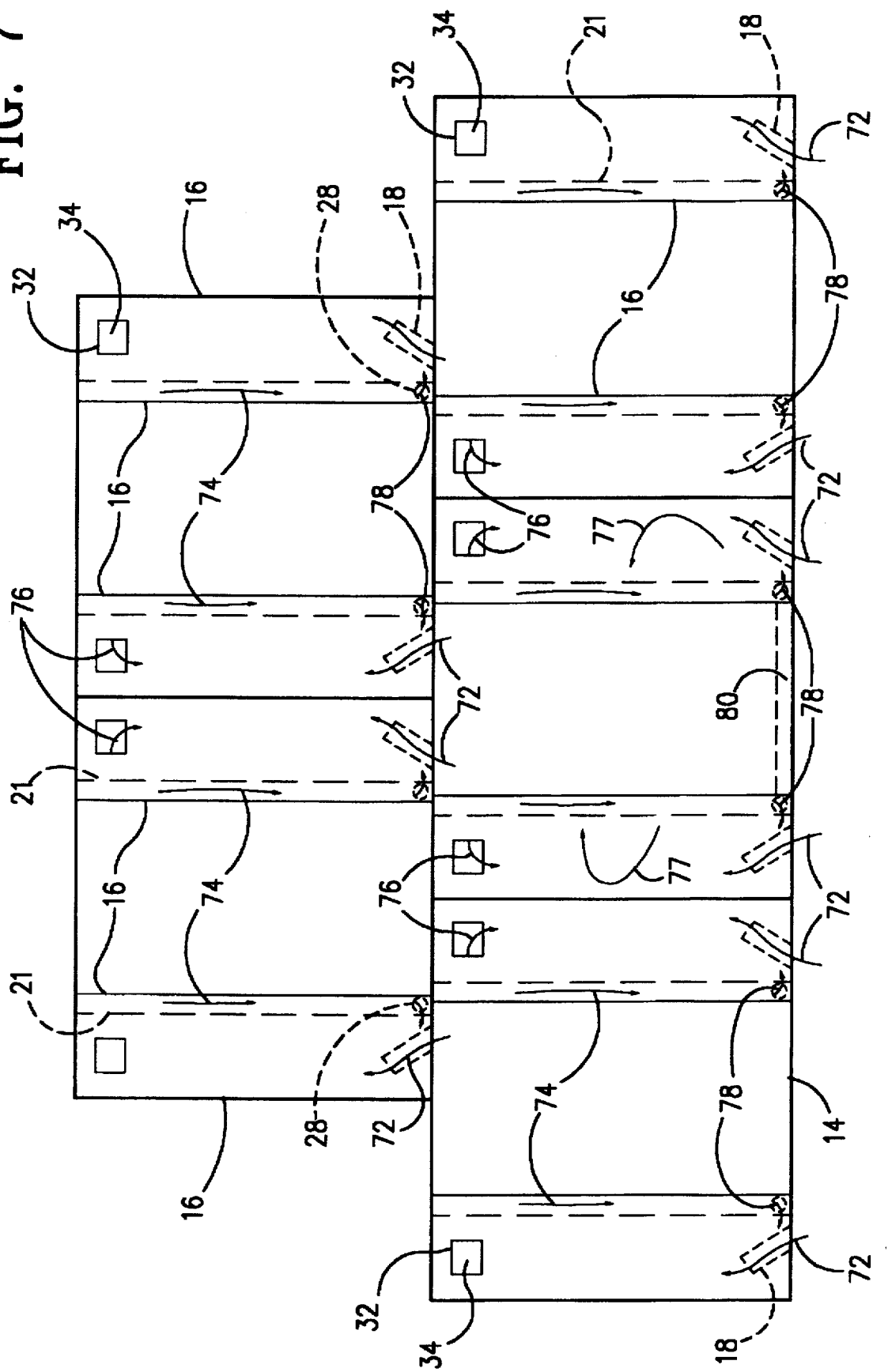
FIG. 7 is a front view of two rows of nested and stacked packing elements with associated downcomers of the fluid separation packing of the present invention.

The flow of the liquid and the vapor through the fluid separation packing 60 of the present invention is illustrated in FIG. 7. The upcoming vapor flows through the openings in the base 14 and is directed by the vapor tabs 18 towards the side walls 16 of the packing elements 12 as shown by lines 72. The downcoming liquid flows through downcomers 20 (shown by the dashed internal downcomer side walls 21) as shown by lines 74. The downcoming liquid exits the downcomers 20 through ports 28 as shown by lines 78 (as discussed, a weir 39 as shown in FIG. 2 can be used to seal the ports 28 from the vapor 72). As shown in the center packing element on the bottom row, the liquid pools on the base 14 of the packing element 12, as shown by liquid pool 80, and is thereby entrained by the upcoming vapors, shown by lines 72, thus forming a fluid of both phases as shown by lines 77, which flows in a rotating upward direction along the side walls 16. The upward flowing fluid is then separated near the top of the packing element as the liquid flows through the openings 34 created by the slits 32 as shown by lines 76, and then flows through a downcomer 20 to the next lower level of packing elements. The vapor flows through the base of the next layer of packing elements as shown by line 72.

As can be understood, the separation packing of the present invention is formed within a column or tower by nesting rows of the connected packing elements, along with the associated downcomers, on top of a previous layer of packing elements and associated downcomers. The rows of packing elements preferably encompass the entire internal cross-sectional area of the column, although near the side walls of the column the packing design may need to be altered to accommodate the column wall.

As can be understood, the nesting of the packing elements 12 in such a manner as shown in FIG. 7 results in an increased effective contact between the liquid and vapor phases to improve the overall mass transfer between the two phases. The stacking and nesting of the various levels of the packing elements utilizes the volume within the column more efficiently than tray designs alone, and even tray designs with packing, since both require dead space to exist between the vertically spaced trays. The packing elements of the present invention retain the efficiencies provided by conventional tray designs in that there is still contact between the liquid and vapor within a packing element much like a tray, except that in the present invention the contact is improved due to the co-current contacting that can be obtained. Also, there are downcomers for transporting the liquid to lower levels and holes in the lower face of the base of the packing elements through which the vapor can rise. In such a way, the packing elements of the present invention utilize the efficiencies obtainable from both tray designs and packing designs in one system.

The geometry of the packing elements has been described herein as being that of an octagon design, which is the preferred embodiment due to its perceived ease of manufacture and efficiency in use. However, this geometry can be changed to any of a various number of geometries to accomplish the stated purposes of the packing designs of the present invention. In particular, the packing designs of the present invention function to first provide a packing element that is essentially an individual container in which the liquid and vapor are contacted and in which, under proper vapor flow conditions, the contact is in a co-current fashion within the contacting volume. These packing elements have a hole in the lower face of the base of the packing elements through which the vapor can rise and tabs above those holes to direct the flow of the vapor. The packing elements also have the lower portion of a downcomer from the upper level of packing elements emptying the liquid from that upper level onto the base of the packing element where it mixes with the upcoming vapor, and under proper vapor flow conditions, is entrained by the vapor for co-current contact in the contacting volume within the packing element. The packing elements further contain a slit on their side walls, proximate to the top of the side walls, to allow the liquid to enter a downcomer. The second function of the packing designs of the present invention is to provide downcomers in flow communication, and generally connected to, the side walls of the upper level of packing elements to transport the liquid from the liquid slits to the base of the packing element in the lower layer. It can thus be readily understood by those of skill in the art that various geometries, both for the design of the packing element side walls and the downcomers—both the upper portion and the bottom portion of the downcomers—can be utilized as means to accomplish these functions.

For instance, the geometry of the side walls for the packing elements can be changed to a hexagonal arrangement utilizing triangular downcomers. Such a design would, however, result in some of the triangular downcomers formed by a tiling of the plane to be, in some cases, superfluous, and thus this design is less efficient than the preferred octagonal design. Alternatively, a decagonal design could be used for the side walls of the packing elements to tile the plane thus forming bow-tie shaped downcomers, which could effect the efficiency of the co-current rotational flow within the contacting volume of the packing element in the lower level.

The geometry of the downcomers can be altered between the upper portion and the lower portion of the downcomers. The upper portion is defined as that portion that is coextensive with the upper level of packing elements from which the liquid flows into the downcomer. The lower portion is defined as the portion that is coextensive with the lower level of packing elements into which the liquid flows out of the downcomer. In preferred designs, the geometry of the upper portion of the downcomer is dictated by the design of the side walls of the packing elements. However, the lower portion can be made of any geometry, and is preferably designed to enhance the rotational flow within the contacting volume. For instance, in the decagonal design for the packing elements, the bow-tie downcomer shape for the upper portion of the downcomer could be changed, e.g., to a circular design, for the lower portion of the downcomer.

The height and lengths of the side walls of the packing elements can, of course, be altered to optimize the mass separation of the particular application. Generally, however, it is believed that the separation can be efficiently practiced using packing elements that have heights of from about 1 to about 10 inches, preferably from about 2 to about 6 inches. The width of the packing elements, defined as the longest side of the packing element, will generally be from about 0.25 inches to about 5 inches, preferably from about 0.5 inches to about 3 inches.

The fluid separation packing of the present invention can be utilized in various mass separation processing units. The preferred uses, however, are for distillation and fractionation columns. These columns are vertically oriented and have surrounding side walls that are generally cylindrical in shape. The fluids to be separated are generally introduced as liquids, either in the same stream, or as parts of multiple feed streams, and within the column the one fluid is treated in its vapor state while the other fluid is in its liquid state. The packing can be inserted into the columns either as a prefabricated unit of a plurality of pre-nested levels of packing elements, or individual levels of the packing elements can be assembled in the nesting fashion at the site of the column.

In cases of turndown operation, where the vapor pressure is insufficient to provide the necessary lift force to entrain the liquid, the fluid separation packing of the present invention is still operable. In such a turndown mode, the packing of the present invention functions like a dual flow tray, or sieve plate. In such a situation, the downcomers would not be functional, however, due to the decreased load on the column, the loss of the column volume due to the downcomers would not be significant to the overall separation.

What is claimed is:

1. A fluid separation packing, useful as a packing material for distillation and fractionation columns to provide for operation in a co-current mode within the overall counter-current process, comprising:
    (a) a plurality of connected packing elements, said packing elements comprising:
        (1) a base
        (2) a continuous side wall having an upper end and a lower end, said lower end terminating into said base, said upper end defining an upper packing element plane region, and said side walls defining a contacting volume above the base and below the upper packing element plane region;
        (3) at least one vapor opening in said base through which vapors can flow into said contacting volume;
        (4) at least one vapor tab located above said at least one vapor opening;
        (5) at least one liquid slit located on said side wall, said liquid slit defining an opening in said side wall through which liquid can flow;
    whereby said packing elements are connected in such a way that the sidewalls of adjacent packing elements contact each other to an extent and the sidewalls also define an opening between adjacent packing elements;
    (b) a plurality of liquid downcomers comprising:
        (1) downcomer side walls having an upper portion and a lower portion, said upper portion being located within said opening between adjacent packing elements, and said lower portion extending below said packing element base and having a lower portion end;
        (2) at least one downcomer port located proximate to the lower portion end of the downcomer, said port defining an opening in said downcomer side walls through which liquid can flow.

2. The fluid separation packing of claim 1 wherein said at least one vapor opening is located proximate to said side wall.

3. The fluid separation packing of claim 1 wherein said at least one liquid slit is located proximate to the upper end of said side wall.

4. The fluid separation packing of claim 1 wherein said downcomer upper portion is formed by said packing element side walls.

5. The fluid separation packing of claim 1 wherein said packing element side walls form an octagon.

6. A fluid separation packing, useful as a packing material for distillation and fractionation columns to provide for operation in a co-current mode within the overall counter-current process, comprising:
    (a) a plurality of layers of connected packing elements, said packing elements comprising:
        (1) a base
        (2) a continuous side wall having an upper end and a lower end, said lower end terminating into said base, said upper end defining an upper packing element plane region, and said side walls defining a contacting volume above the base and below the upper packing element plane region;
        (3) at least one vapor opening in said base through which vapors can flow into said contacting volume;
        (4) at least one vapor tab located above said at least one vapor opening;
        (5) at least one liquid slit located on said side wall, said liquid slit defining an opening in said side wall through which liquid can flow;
    (b) a plurality of liquid downcomers formed between said packing elements comprising:
        (1) downcomer side walls having an upper portion and a lower portion, said upper port, on being formed by said packing element side walls, and said lower portion extending below said packing element base and having a lower portion end;
        (2) at least one downcomer port located proximate to the lower portion end of the downcomer, said port defining an opening in said downcomer side walls through which liquid can flow;
    whereby the layers of said packing elements are arranged such that the downcomer having its upper portion formed from the sidewalls of packing elements in a first row of packing elements has its lower portion located in the contacting volume of a packing element in a second row of packing elements located directly beneath the first row.

7. The fluid separating packing of claim 6 wherein the vapor opening is located at a point between the sidewall and the lower portion end of the downcomer.

8. The fluid separation packing of claim 7 wherein said at least one liquid slit is located proximate to the upper end of said side wall.

9. The fluid separation packing of claim 7 wherein the packing element sidewalls form an octagon.

10. The fluid separation packing of claim 7 wherein the vapor tabs are situated such that they direct vapor flow through the vapor openings towards the sidewalls.

11. A fluid separation packing, useful as a packing material for distillation and fractionation columns to provide for operation in a co-current mode within the overall counter-current process, comprising:
    (a) a plurality of connected packing elements, said packing elements comprising:
        (1) a base
        (2) a continuous side wall having an upper end and a lower end, said lower end terminating into said base, said upper end defining an upper packing element plane region, and said side walls forming an octagon and defining a contacting volume above the base and below the upper packing element plane region;
        (3) a plurality of vapor openings in said base through which vapors can flow into said contacting volume;
        (4) vapor tabs located above said vapor openings;
        (5) a plurality of liquid slits located on said side wall and proximate to said sidewall upper end, said liquid slits defining openings in said side wall through which liquid can flow;
    whereby said packing elements are connected in such a way that the sidewalls of adjacent packing elements contact each other and the sidewalls also define a sided opening between adjacent packing elements;
    (b) a plurality of liquid downcomers comprising:
        (1) downcomer side walls having an upper portion and a lower portion, said upper portion being coextensive with said sidewalls of said packing element that form the four-sided openings and said lower portion extending below said packing element base and having a lower portion end;
        (2) at least one downcomer port located proximate to the lower portion end of the downcomer, said port defining an opening in said downcomer side walls through which liquid can flow.

12. In a process for fractionating, distilling, or the like, the improvement comprising:
(a) providing a vertical column having surrounding sidewalls;
(b) feeding a first and a second fluid into the column, wherein the first fluid is in its vapor state and the second fluid is in its liquid state within the column;
(c) directing the first and second fluids to flow through various stacked layers of connected packing elements, said packing elements comprising:
  (1) a base
  (2) a continuous side wall having an upper end and a lower end, said lower end terminating into said base, said upper end defining an upper packing element plane region, and said side walls defining a contacting volume above the base and below the upper packing element plane region;
  (3) at least one vapor opening in said base through which vapors can flow into said contacting volume;
  (4) at least one vapor tab located above said at least one vapor opening;
  (5) at least one liquid slit located on said side wall, said liquid slit defining an opening in said side wall through which liquid can flow;
whereby said packing elements are connected in such a way that the sidewalls of adjacent packing elements contact each other and the sidewalls also define an opening between adjacent packing elements;
(d) also directing said fluids to flow through a plurality of liquid downcomers comprising:
  (1) downcomer side walls having an upper portion and a lower portion, said upper portion being located within said opening between adjacent packing elements, and said lower portion extending below said packing element base and having a lower portion end;
  (2) at least one downcomer port located proximate to the lower portion end of the downcomer, said port defining an opening in said downcomer side walls through which liquid can flow;

whereby the vapors present within said column flow upward from one layer of packing elements to the next through said vapor openings and the liquid present within said column flows downward from one layer of packing elements to the next by passing through said liquid slit and through the downcomers, and whereby the liquid and vapor contact each other in a co-current fashion within the contacting volume of the packing elements.

13. The process of claim 12 wherein said at least one vapor opening is located proximate to said side wall of said packing element.

14. The process of claim 12 wherein said at least one liquid slit is located proximate to the upper end of said side wall of said packing element.

15. The process of claim 12 wherein said downcomer upper portion is formed by said packing element side walls.

16. The process of claim 12 wherein said side walls of said packing element form an octagon.

17. The process of claim 12 wherein the vapor flowing through the vapor openings is directed towards the side walls of said packing element by the vapor tabs.

18. The process of claim 12 wherein the liquid exits through the port on the downcomer and is entrained by the vapor flowing through the vapor opening on the base of the packing element.

19. The process of claim 18 wherein the entrained liquid and vapor co-currently flow upward within the contacting volume within the packing element.

20. The process of claim 19 wherein the liquid and vapor are separated within the contacting volume proximate to the upper packing element plane region with the vapor flowing to the next vertically higher layer of packing elements by flowing through said vapor opening and the liquid flowing to the next vertically lower layer of packing elements by flowing through said downcomer.

* * * * *